UNITED STATES PATENT OFFICE.

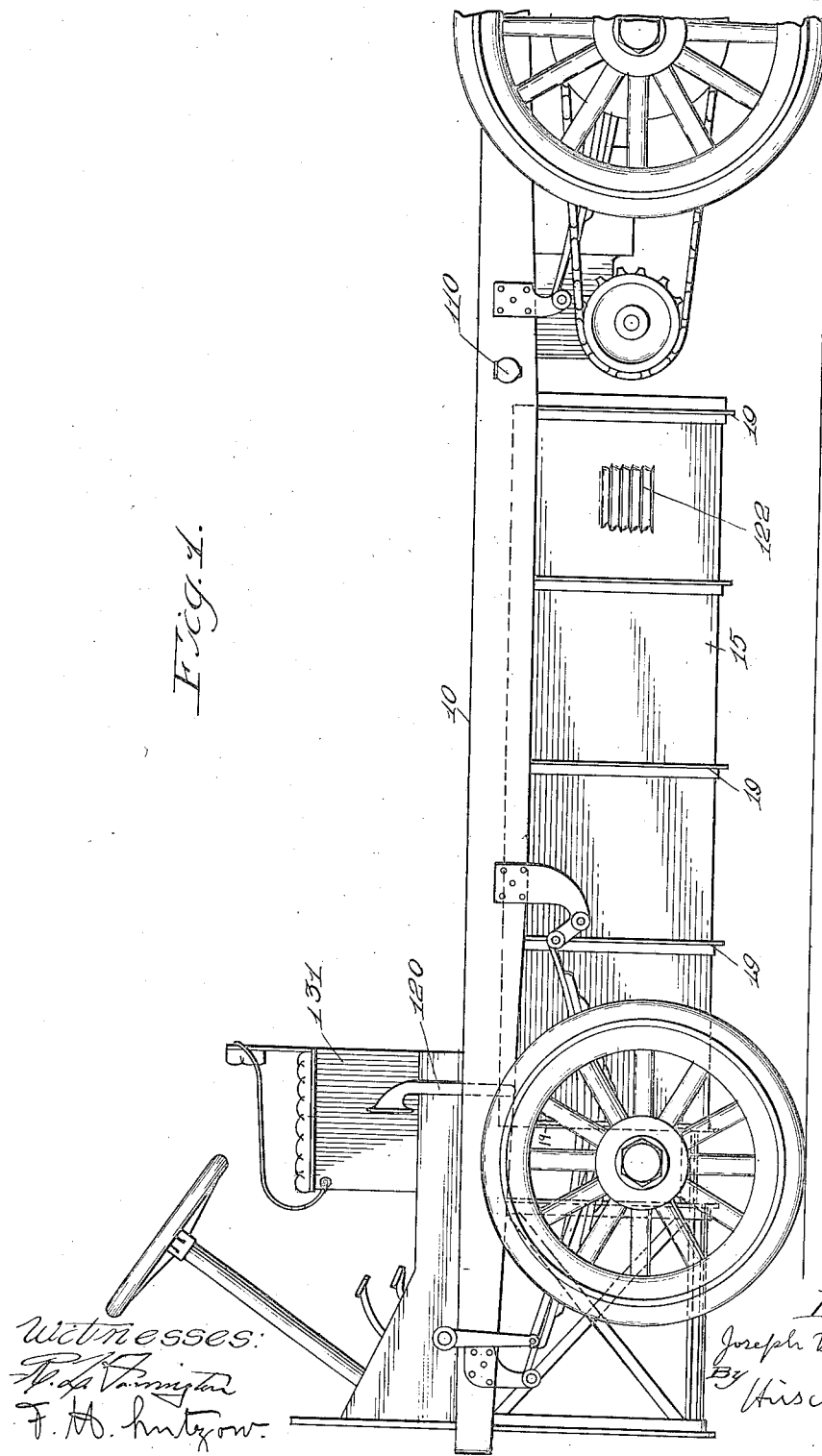

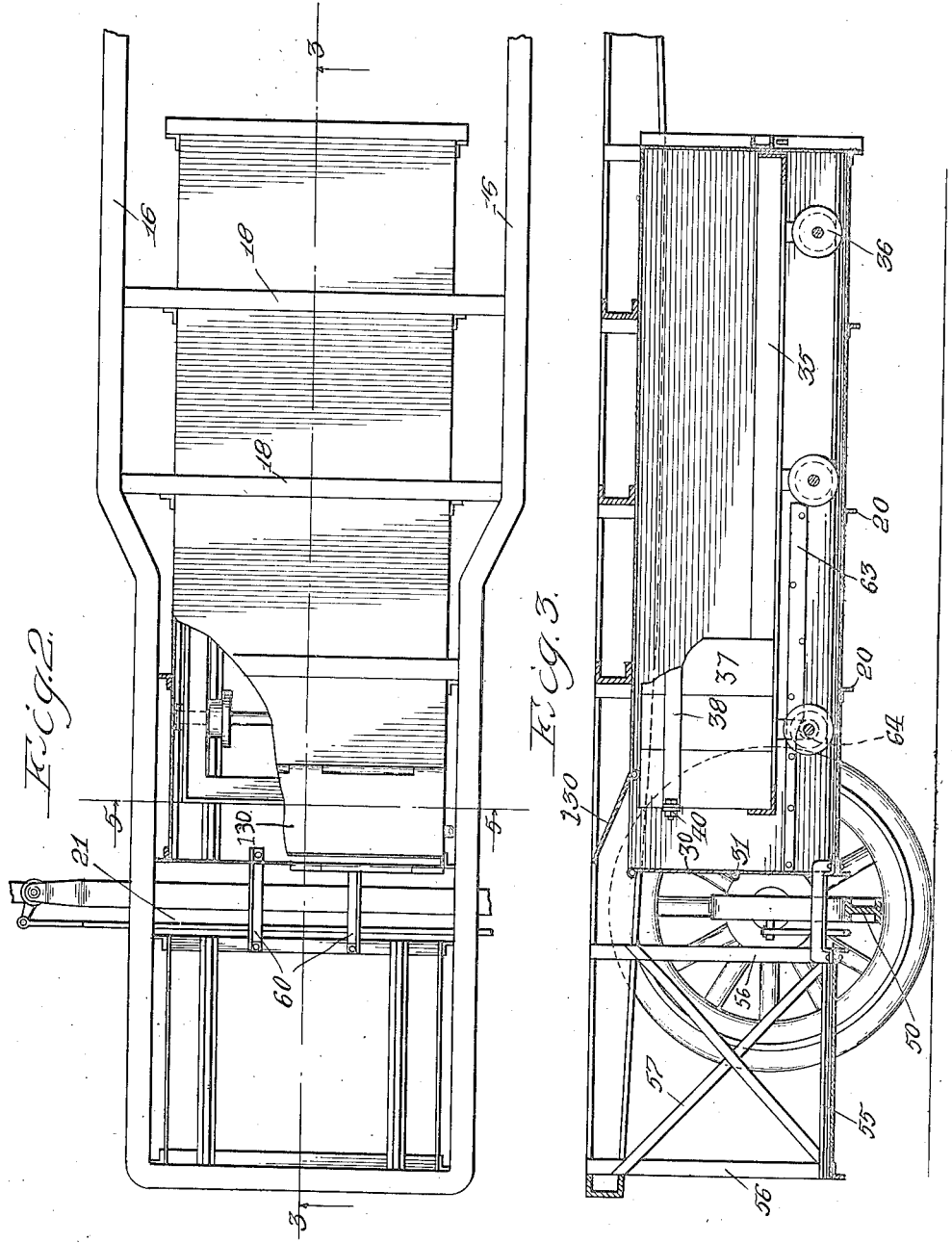

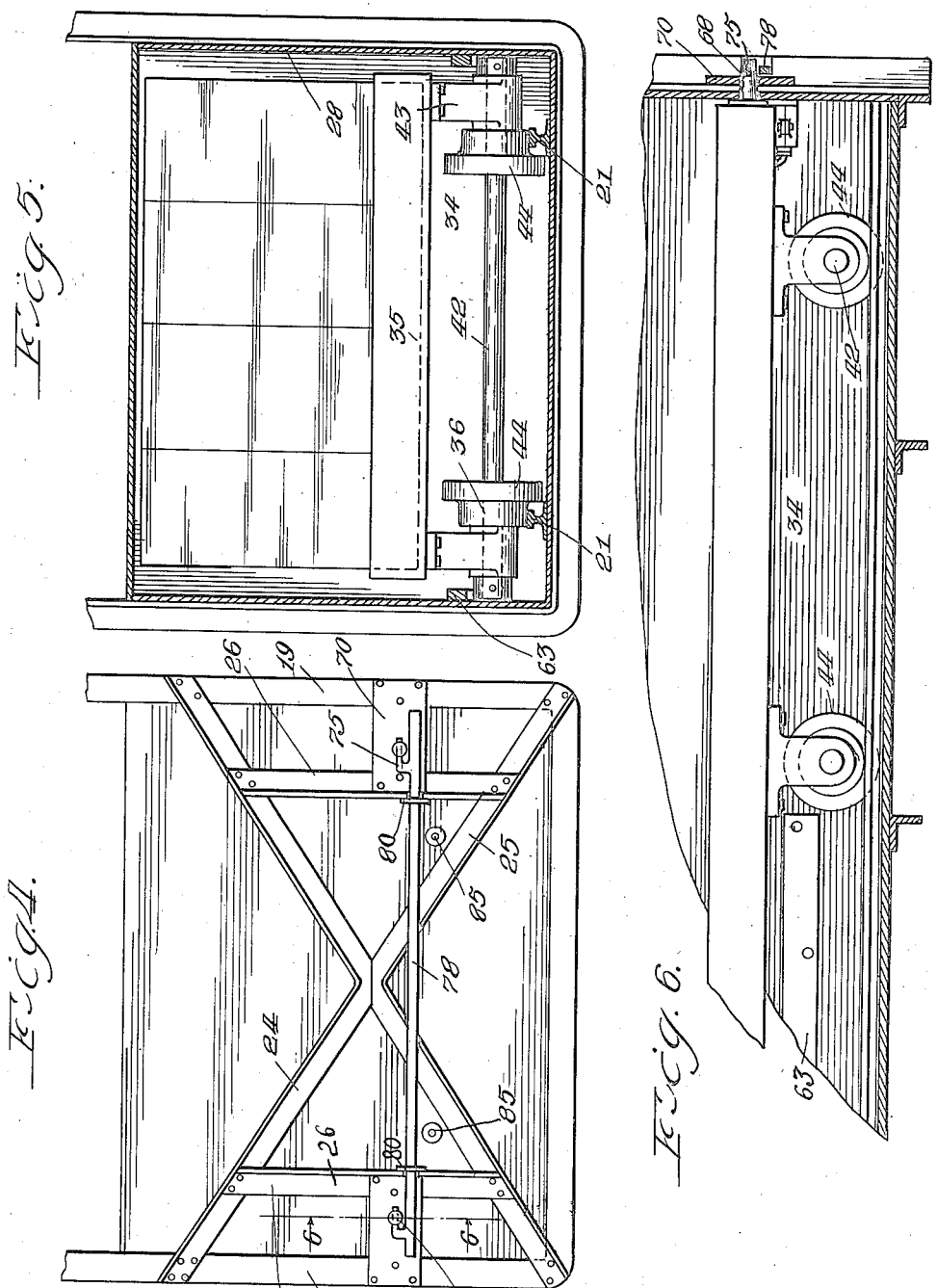

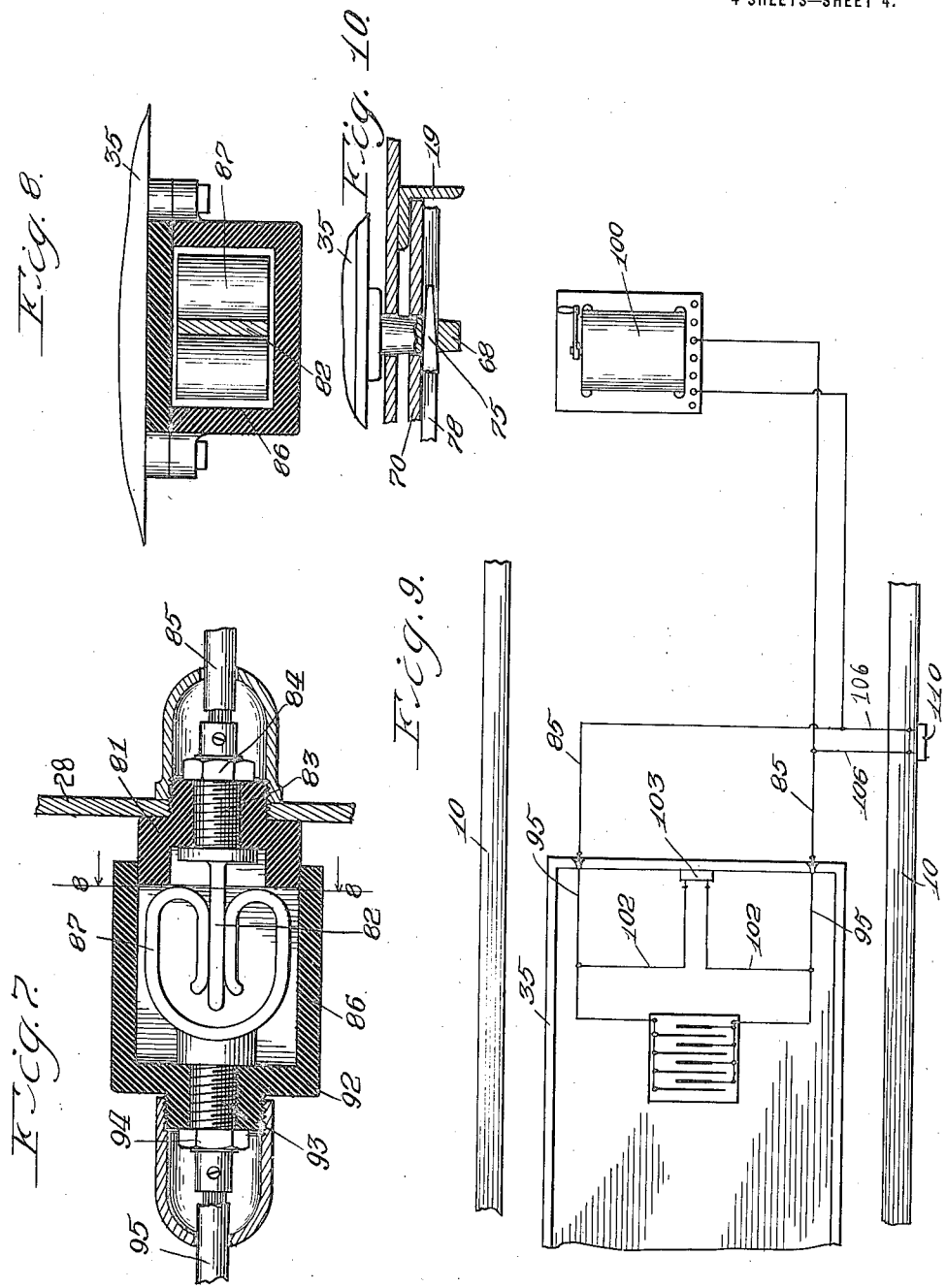

JOSEPH M. KLINGELSMITH, OF CHICAGO, ILLINOIS, ASSIGNOR TO KLINGELSMITH ELECTRIC TRUCK COMPANY, OF CHICAGO, ILLINOIS, A CORPORATION OF MAINE.

ELECTRICALLY-PROPELLED VEHICLE.

1,165,784.   Specification of Letters Patent.   Patented Dec. 28, 1915.

Application filed June 19, 1913. Serial No. 774,716.

*To all whom it may concern:*

Be it known that I, JOSEPH M. KLINGELSMITH, a citizen of the United States, residing at the Warner Hotel, Thirty-third street and Cottage Grove avenue, in Chicago, county of Cook, and State of Illinois, have invented new and useful Improvements in Electrically-Propelled Vehicles, of which the following is a specification.

Among engineers and others connected with the motor car industry it has long been recognized that the electrically propelled vehicle has many inherent advantages over other mechanically propelled vehicles and in particular that the electric car is especially adapted for work in congested traffic and other places where frequent starts and stops are necessary. Because of its high torque at low speed the electric motor is particularly suited for quick acceleration which is necessary under such conditions; and where initial cost, cost of maintenance, and cost of operation are also carefully considered, as in the case of commercial vehicles, the demand is also great for a power vehicle which is low in first cost, which will operate with a maximum efficiency at different speeds, and which is low in its maintenance cost. The electric vehicle answers these requirements and in addition has such other advantages as adaptability to all conditions of weather and temperature; quietness of running, which is simply another manifestation of its mechanical efficiency; and simplicity in construction and operation.

The single disadvantage of the electric vehicle has always been its limited mileage on a battery charge, which is, of course, due to the great weight of battery necessary for a given output, and the practical limits which are reached in the size and weight of the battery equipment. Vehicles, of course, have been built with batteries of great capacity, but at the expense of great weight; which means increased cost of operation in carrying around the extra dead weight, and increased maintenance cost because of the extra load on the frame, axles and other parts of the vehicle, in addition to the increased maintenance cost of the battery itself; and such a vehicle is necessarily limited in the proportion of its carrying capacity to its own weight. A battery of large capacity and consequent long discharge rate also requires a proportionately longer charging time, so that a vehicle so equipped suffers the same disadvantage of a vehicle with a smaller battery, of idle periods for charging during which the interest on the investment is being lost. Attempts have been made to overcome this last disadvantage by "boosting" a battery on charge, or charging it at a very high charging rate; with consequent injury to the battery and therefore higher maintenance cost and shorter life. In the operation of an electric vehicle, time is also lost in giving the batteries the care and attention which they require in addition to the charging, such as washing the plates, renewing electrolyte, flushing, etc., and some of the time consumed in these operations is usually lost in removing batteries from their more or less inaccessible positions in the vehicles and in again replacing them.

In order to overcome some of the foregoing disadvantages attendant upon the operation of an electric vehicle and in order to increase its range of operation and usefulness and efficiency the present invention contemplates the construction of a vehicle with a battery designed to be readily removable and interchangeable in the vehicle so that a discharged battery can be quickly taken out of the vehicle and replaced by a fully charged one, with practically no loss of time in the running of the vehicle. A vehicle so designed and equipped with a readily removable battery can work continuously on scheduled trips and battery stations can be arranged where the vehicle may be supplied with a fresh battery as often as necessary, so that it may be kept in continuous operation; while the dead weight of battery equipment which it carries constantly can be reduced to a minimum, since battery changes can be arranged as desired. In such case also, if unusual traffic conditions, such as snow or deep mud cause an extra power consumption, a larger battery may be supplied, or additional battery replacements may be made to suit such conditions, still without material sacrifice in the running time of the vehicle.

In addition a battery which can be readily removed from the vehicle and is designed to be charged outside of the vehicle can be charged at a low charging rate without sacrificing the running time of the vehicle, with consequent increase in the life and power efficiency of the battery and decrease in its maintenance cost, and can also receive better care and attention in the washing and replacement of plates, renewal of electrolyte, flushing, etc., than a battery which remains in an inaccessible position in a vehicle and is available for inspection, care and attention only during such times as the vehicle can be withdrawn from its service on the road; and if battery renewals can be readily made without interfering with the use of the vehicle, the batteries need not ordinarily be discharged beyond the point of their best power and maintenance efficiency, but can be removed for replacement by fresh ones when only partially discharged.

An electric vehicle equipped with a battery which is designed for ready removal and replacement is described and illustrated in the accompanying drawings showing an electric commercial vehicle, or truck, embodying the principles of this invention.

In such drawings: Figure 1 is a view of the vehicle chassis in side elevation. Fig. 2 is a top plan view with parts broken away. Fig. 3 is a longitudinal vertical section on the line 3—3 of Fig. 2. Fig. 4 is a view showing the battery compartment in rear end elevation. Fig. 5 is a transverse vertical section on the line 5—5 of Fig. 2. Fig. 6 is a longitudinal vertical section on the line 6—6 of Fig. 4. Fig. 7 is a horizontal section through one of the contact makers for connecting the removal battery to the vehicle. Fig. 8 is a vertical section through the same part on the line 8—8 of Fig. 7. Fig. 9 is a wiring diagram of the complete vehicle. Fig. 10 is a horizontal section through one of the locking devices for locking the removable battery in the vehicle.

As shown in said drawings the truck chassis comprises a horizontal frame 10, and wheels, axles, springs and driving gear of well known and approved form; and below the frame is suspended the battery which is housed in a battery compartment 15 suspended from the frame of the vehicle. More particularly described the frame of the vehicle includes horizontal side members 16, 16 which may be inswept or drawn together at the front of the vehicle, as shown, to permit of shorter turning of the front wheels; and connecting them are transverse members 18, 18. From the latter are suspended vertical members 19, 19 preferably of angle section and formed integral with horizontal sills or cross members 20, 20 as shown in Fig. 3. These carry the weight of the battery which is suspended from the frame of the vehicle and on them are laid horizontal rails 21 forming a track for a small car or truck in which the battery is mounted. The rear part of the battery compartment is braced by a diagonal bracing formed of two angle members 24, 25 each bent into the shape of a V and joined at their apexes in the form of a letter X. Their ends are riveted to the rearmost of the vertical members 19 and to them are also joined the ends of short vertical struts 26, 26 for additional reinforcement. The top, bottom, rear and sides of the entire battery compartment are inclosed by a thin sheet metal lining 28 in order to exclude water and dirt. Its front end is closed by a door 30 which is hinged at its top and designed to fold horizontally across its middle, as shown at 31.

Referring now to the means for inserting and withdrawing a complete battery from the vehicle there is also provided a small car or truck 34 which is constructed with a horizontal rectangular frame of angle members 35 mounted on flanged wheels 36. The battery cells are arranged in trays 37 of well known and approved construction and the trays are set cross-wise in the frame 35 of the battery car, the ends of each tray resting on the horizontal flanges of the two side members of the frame; and in order to brace all of the trays together to prevent vibration and jolting from working them loose a band or strap 38 is bolted around all of the trays near their tops, the strap being made in two pieces meeting at diagonally opposite corners and secured by two bolts 40. The wheels 36 are made solid on their axles 42 and the load of the battery car is carried on them by means of journal brackets 43 which are bolted to the underside of the frame 35; and as an additional improvement each wheel is made with a wide flange 44 so that if desired the car may be rolled over a flat surface or floor without rails.

In order to provide sufficient clearance over the front axle 50 of the vehicle for the insertion of the battery car 34 into the battery compartment 15, and its withdrawal therefrom, while still leaving sufficient road clearance, the axle is dropped in its middle part, as shown, and the battery compartment is placed entirely behind it; the rails 21 being discontinued over the axle. In front of the axle, however, the track is continued by the addition of two rails 55 which are suspended from the frame above through vertical struts 56 with diagonal bracing 57 to support the battery car when it is pulled forward out of the vehicle; and the break in the rails over the axle 50 is bridged by means of two parallel bars 60, 60, spaced considerably nearer together than the two rails and of sufficient height to support the car axles 42 when the battery car is drawn over them. By reason of the difference in height between the axles 42 and the rims of the wheels which rest on the rails, the bridge pieces 60 may be placed considerably above the level of the rails 21 and high enough to allow sufficient clearance above the axle 50 for the springing of the vehicle.

When the battery car is carried in the vehicle it is of course subject to a great deal of jolting and bumping over rough roads and means are therefore provided as follows for holding it firmly down on its rails, and for anchoring it solidly within the battery compartment: In the lower forward part of the compartment and fixed to each side wall are horizontal plates or bars 63, each of which is cut off on its underside to form a bevel or wedge surface 64 engaging with an end of the first axle 42 on the battery car; this axle being made slightly larger in diameter at its ends than the other two axles which are designed to pass freely under the bar 63 when the battery car is drawn out or in. The diameter of the second and third axles is sufficient however, for their ends to pass closely beneath the two bars 63 so that when the battery car is drawn out of the front of the vehicle the bars will hold these axles and prevent the car from tipping downward in front, in case a break is left between the rails 55 and the stationary platform upon which the battery car is drawn. At its rear end the car frame 35 is provided with tapered or conical projections 68 adapted to engage in correspondingly shaped openings through heavy plates 70 which are secured to the vertical members 19 and the adjacent vertical struts 26 of the rear wall of the battery housing. By the wedging of the projections 68 into these openings and the wedging of the front axle 42 under the two bars 63 the car is held firmly down upon its rails and it is necessary therefore only to provide a locking means to prevent it from rolling forward. For this purpose diametrical slots are cut through the ends of the projections 68 which extend beyond the plates 70 for engagement by two locking bolts or pins 75. The latter are connected together by a sliding horizontal bar or shaft 78 having bearings in the longitudinal flanges of the two vertical reinforcing struts 26 which connect the diagonal braces 24 and 25. The bearings through these flanges are formed by cutting notches in them to receive the bar 78 and confining the bar within them by cover plates 80. The pins 75 are inserted, or withdrawn, to lock the battery car within the battery compartment, or to release it, by sliding the bar 78 horizontally.

The back wall of the battery housing, formed by the vertical and diagonal frame members 19, and 24, 25, respectively, with their reinforcing parts and sheet metal covering, also supports contact devices which are engaged by corresponding parts on the battery card to make the necessary electrical connections when the battery car is run into its compartment, and for this purpose two insulating blocks 81 are secured to the brace 25. From each of these there extends inward a metal strip or blade 82 which is made integral with a threaded shank 83 secured in the insulating block by means of a nut 84; and to these shanks are attached the wires 85 leading to the controller of the vehicle. On the end of the battery car 34 are placed corresponding female parts each of them comprising a housing or receptacle 86 of suitable insulating material within which is arranged a flat spring 87 bent through a curve in its middle part and with its ends approaching each other to engage with the corresponding blade or contact piece 82. The middle part of the curved spring 87 is secured to a metal block 92 having a stem or shank 93 similar to the part 83, and similarly secured in the insulation, and to it is attached a wire 95 leading from one pole of the battery. The other battery terminal is similarly connected to an identical socket receptacle. In Fig. 9 the wiring of the vehicle is shown diagrammatically and it will be seen that by means of the two wires 95 the current is led to the contact devices on the end of the battery car, and thence through the wires 85 to the controller, indicated diagrammatically at 100, for distribution to the motors as required. The two terminals of the battery are also connected by other wires 102 with a charging receptacle or socket of any well known and approved form which is fixed to the battery car between the two sockets 86 and is indicated diagrammatically at 103, so that when the battery car is withdrawn from the vehicle its battery may be charged by the insertion into this receptacle of a charging plug connected to a source of current in the well known manner; and in addition to these parts two wires 106 connected in parallel to the wires 85 lead to a similar charging receptacle 110 which is attached to any convenient part of the vehicle so that if desired a charging plug may be inserted into this receptacle and the battery charged within the vehicle. An additional purpose of this latter receptacle is to provide means for energizing the vehicle when its battery is removed from it by the insertion of a charging plug connected by suitable flexible wiring, trolley or other device, with a source of current; so that it may be moved about under its own power in the garage, or otherwise. As an additional improvement the inclosed battery compartment with its sheet metal covering is provided with means for cooling and ventilating its interior by the introduction of fresh air through a tube or funnel 120 having its outer end exposed at the side of the vehicle and enlarged or flared to catch the wind; and in the rear part of the housing openings or louvers 122 are provided for the outlet of air. A trap door 130 is also provided in the top of the battery housing at its front end, which is accessible beneath the seat 131 of the vehicle so that access may be had into the housing for the inspection and repair of the battery when the vehicle is on the road and facilities are not at hand for withdrawing it from the vehicle. In such case the trap door may be opened and the battery car drawn forward to bring the part of the battery requiring attention beneath it; and if it is necessary to withdraw the battery car far enough for its front axle to overhang the ends of the rails 55 the horizontal bars 63 will engage with the last axle and prevent the back end of the car from tipping up.

In the operation of the device it is necessary only to run the vehicle up to a suitable platform of the height of the rails 35, which plaform may also be provided with rails to meet those carried by the vehicle, when the battery car may be withdrawn from the battery compartment and replaced by another containing a charged battery; or the first battery may be charged and replaced if desired. In either case also current may be supplied to the vehicle when its battery is absent through the charging receptacle 110 for the purpose of moving it about under its own power, and if desired, its battery may be charged within it through the same means; or the vehicle may be energized by an external current and its battery charged at the same time, the battery at such time being "floated on the line", as it is termed. The simple operation of the door 30 and the locking device 78 is all that is necessary to permit the withdrawal of a battery from its compartment, or the insertion of a fresh one to replace it, the electric connections being made and broken by the simple entrance of the battery or its withdrawal as above described.

All features herein disclosed and not specifically claimed are not disclaimed or dedicated to the public, but are the subject of other applications filed or to be filed.

I claim as my invention:

1. The combination with an electric vehicle having a battery compartment and rails in such compartment, of a car having wheels to fit such rails and adapted to enter entirely into such compartment, a battery mounted in such car, means for locking the car in such compartment, an electrical contact device on such car, electrical connections from the battery to such contact device, and an engaging contact device on the vehicle.

2. The combination with an electric vehicle having a battery compartment and a battery for supplying current to such vehicle, of rails in such battery compartment, and a car having wheels fitting such rails, adapted to contain the complete battery as a unit, and to efficiently transport such battery about outside of the vehicle, such car with its contained battery being adapted to enter entirely into such battery compartment.

3. The combination with an electric vehicle and an inclosed battery compartment of ventilating means for introducing fresh air into such compartment and causing a circulation of air therethrough.

4. The combination with an electric vehicle having an inclosed battery compartment, of ventilating means for introducing fresh air into such compartment, such means including an air intake opening, an air discharge opening, and means for inducing a draft of air through such openings and through the battery compartment.

5. The combination with an electric vehicle, a battery compartment therefor, a removable battery in such compartment, wiring in the vehicle, and contact devices for connecting such battery with such wiring, of another contact device carried by said vehicle for supplying current thereto from an outside source and independently of said battery.

6. The combination with an electric vehicle having a battery compartment, of a car adapted to enter entirely into such compartment and having wheels adapting it for efficient transporting about outside of the compartment, a battery mounted in such car, means for locking the car in the compartment, an electrical contact device on the car, electrical connections from the battery to such contact device, and an engaging contact device on the vehicle.

7. The combination with an electric vehicle having a battery compartment, of a car, a complete battery for such vehicle mounted in such car, such car with its contained battery being adapted to enter entirely into such compartment, and wheels on such car adapting it for efficient transporting about outside of the vehicle.

8. The combination with an electric vehicle having a battery compartment, of a car, a complete battery for such vehicle mounted in such car, such car with its contained battery being adapted to enter entirely into such compartment, wheels on such car adapting it for efficient transporting about outside of the vehicle, an electrical contact device on the car, electrical connections from the battery to such contact device, and an engaging contact device on the vehicle.

9. The combination with an electric vehicle having a battery compartment and a battery for supplying current to such vehicle, of a car adapted to contain the complete battery as a unit and having wheels adapting it for efficient transporting about outside of the vehicle, such car with its contained battery being adapted to enter entirely into such battery compartment.

10. The combination with an electric vehicle having a battery compartment and a battery for supplying current to such vehicle, of a car adapted to contain the complete battery as a unit and having wheels adapting it for efficient transporting about outside of the vehicle, such car with its contained battery being adapted to enter entirely into such battery compartment, and means for locking it securely therein.

In witness whereof, I have hereunto subscribed my name in the presence of two witnesses this 12th day of June, 1913.

JOSEPH M. KLINGELSMITH.

Witnesses:
    F. H. LUTZOW,
    LILLIAN E. CHRISTIANSON.